United States Patent

Enters et al.

[15] 3,678,770

[45] July 25, 1972

[54] SINGLE LEVER CONTROL

[72] Inventors: Edward W. Enters, Fredonia; Warren H. Price, Sheboygan; John W. Davies, III; Lynn E. Hochwitz, both of Plymouth, all of Wis.

[73] Assignee: Gilson Bros. Co., Plymouth, Wis.

[22] Filed: Sept. 22, 1970

[21] Appl. No.: 74,282

[52] U.S. Cl. .............................................. 74/197, 74/473
[51] Int. Cl. ................................... F16h 15/08, G05g 9/02
[58] Field of Search ........................... 74/194, 196, 197, 473

[56] References Cited

UNITED STATES PATENTS

| | | | |
|---|---|---|---|
| 3,445,991 | 5/1969 | Hanson et al. | 74/194 X |
| 3,398,807 | 8/1968 | Berger | 74/197 X |
| 1,133,690 | 8/1915 | Woodhull | 74/197 X |
| 1,147,268 | 7/1915 | Rogers | 74/197 |
| 3,327,546 | 6/1967 | Gordon et al. | 74/194 |

*Primary Examiner*—Leonard H. Gehrin
*Attorney*—Wheeler, House & Wheeler

[57] ABSTRACT

Disclosed herein is a single lever control for varying the speed and direction of rotation of drive wheels in a vehicle such as a snow thrower and for also clutching and declutching the drive train to the drive wheels. The control lever is supported on the vehicle handling bar assembly for movement about first and second axes and is guided for movement by a guide track having forwardly and rearwardly extending slots with appropriate indicia for the various forward speeds and reverse. Movement of the control lever about the first axis in a slot transverse to the direction of movement of the vehicle, actuates a speed control rod linkage to axially shift a rubber friction wheel on a spline shaft to change the position of engagement of the friction wheel with respect to the drive disc to vary the speed of the vehicle drive wheels. Forward movement of the control lever about the second axis, and from the transverse slot into one of the various fore and aft slots, moves a clutch linkage to swing the friction wheel into engagement with the friction disc. Toggle links in the clutch linkage provide a "feel" to the operator, a mechanical advantage to assist clutching and declutching and maintain the friction wheel in engagement in the forward positions.

17 Claims, 9 Drawing Figures

Patented July 25, 1972
3,678,770
4 Sheets-Sheet 1
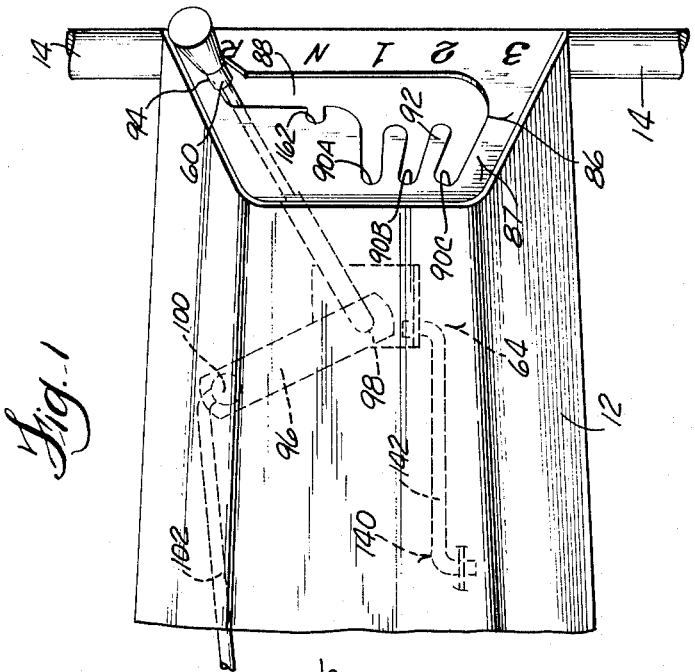
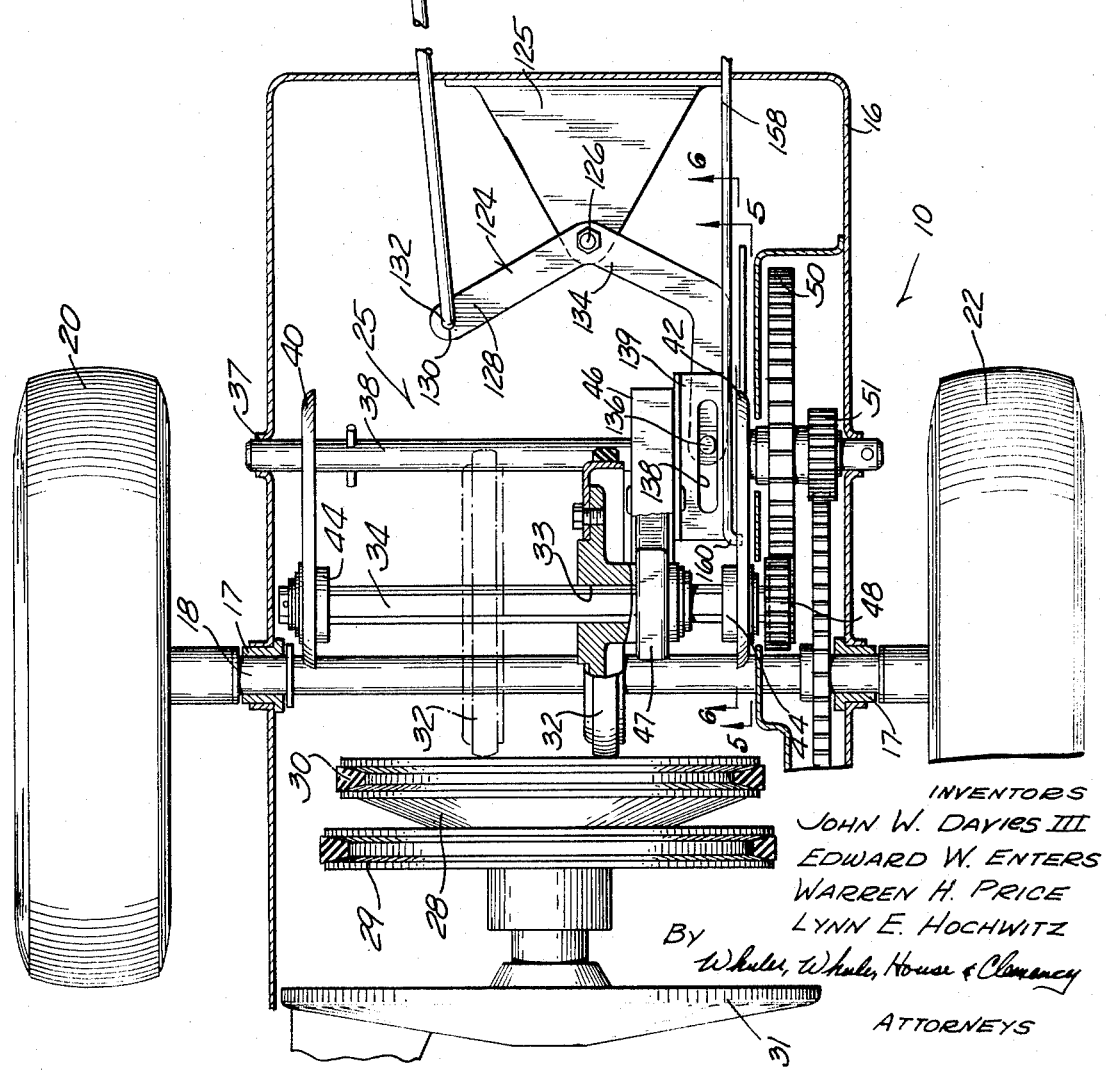
INVENTORS
JOHN W. DAVIES III
EDWARD W. ENTERS
WARREN H. PRICE
LYNN E. HOCHWITZ
BY Wheeler, Wheeler, House & Clancy
ATTORNEYS

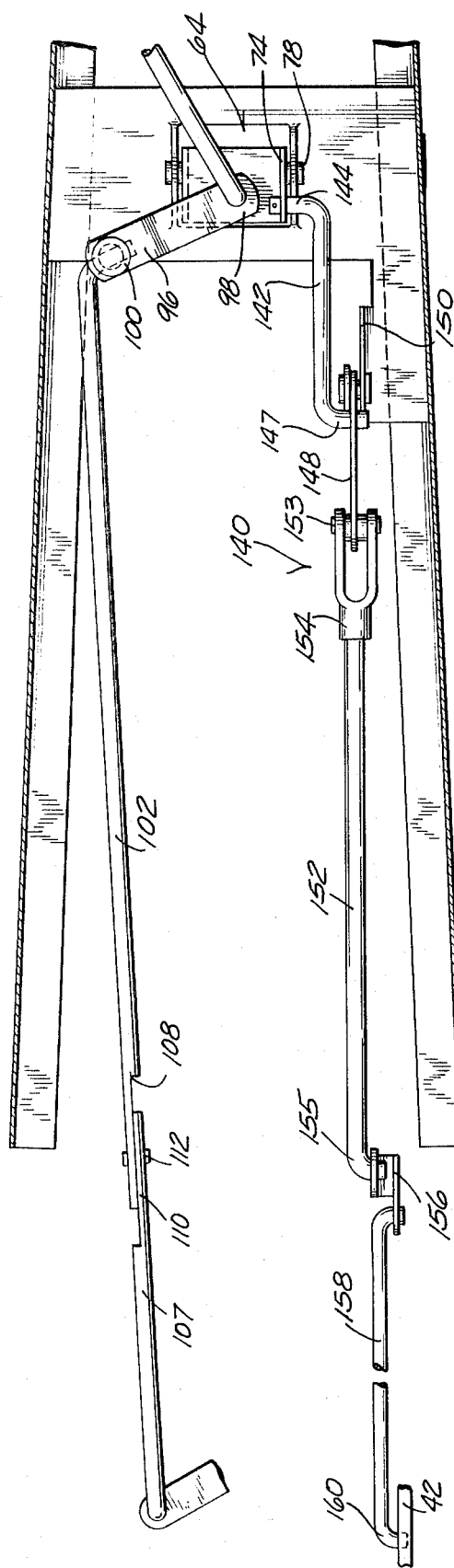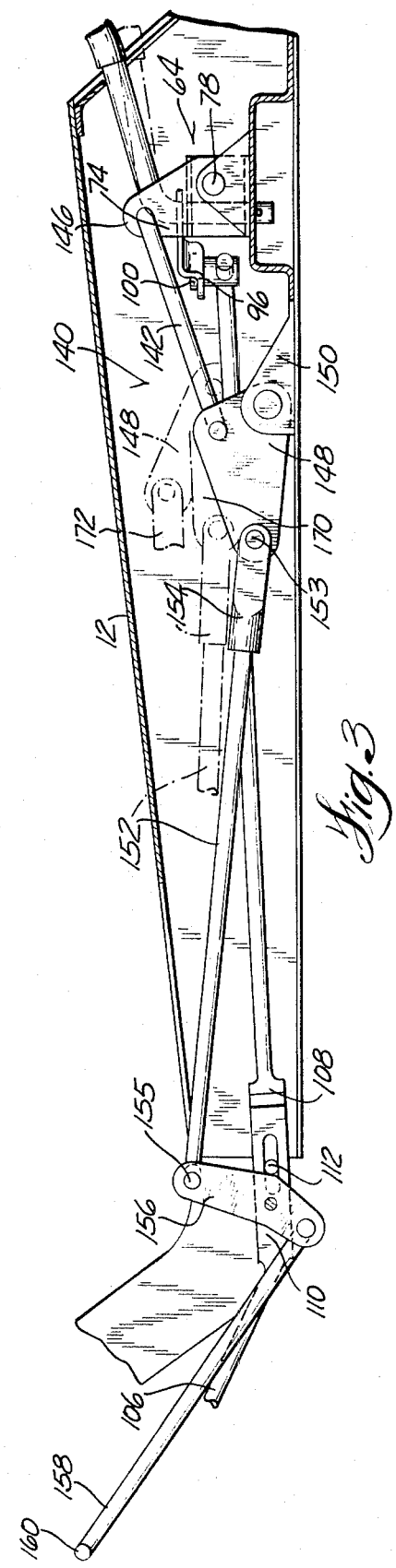

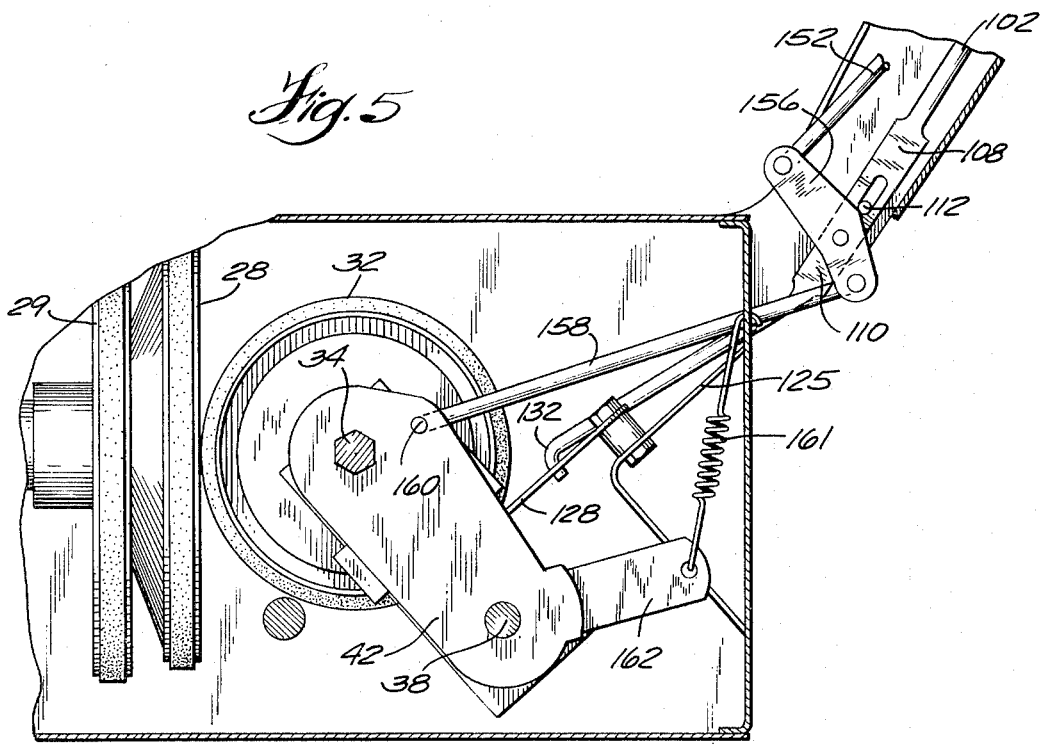
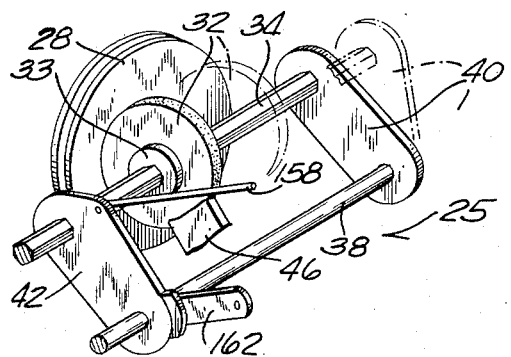
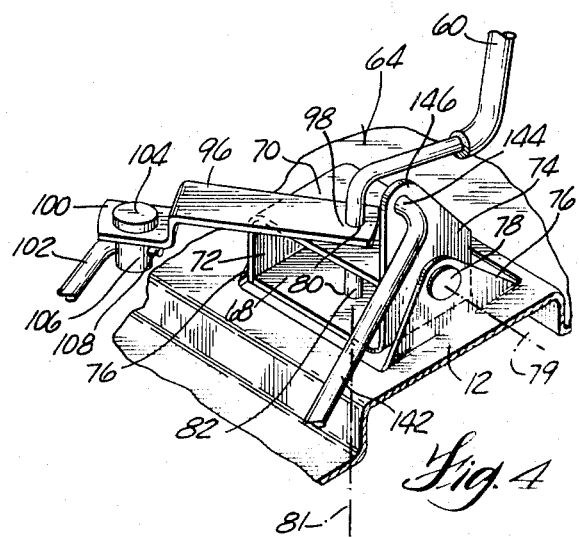
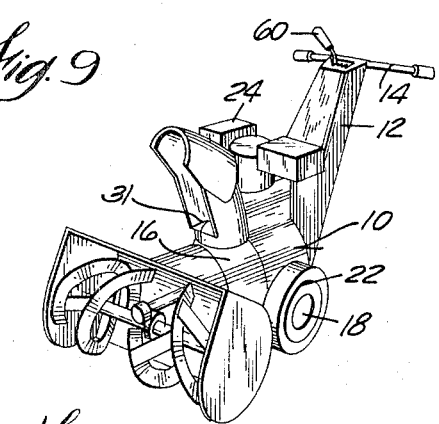
INVENTORS
JOHN W. DAVIES III
EDWARD W. ENTERS
WARREN H. PRICE
LYNN E. HOCHWITZ
By
Wheeler, Wheeler, House & Clancy
ATTORNEYS Patented July 25, 1972
3,678,770
4 Sheets-Sheet 4
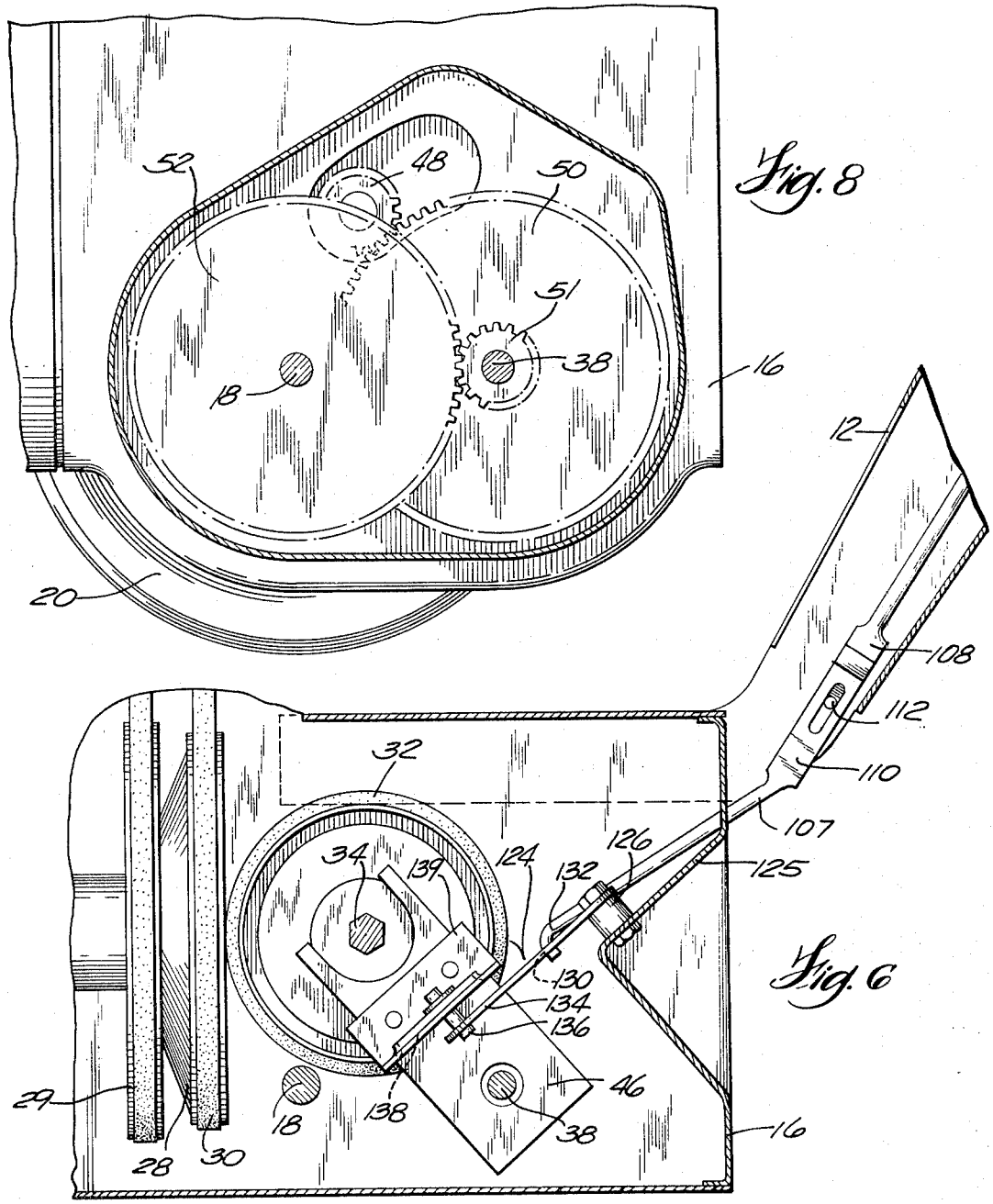
INVENTORS
JOHN W. DAVIES III
EDWARD W. ENTERS
WARREN H. PRICE
LYNN E. HOCHWITZ
By
Wheeler, Wheeler, House & Clemency
ATTORNEYS

SINGLE LEVER CONTROL

BACKGROUND OF THE INVENTION

The invention provides a single lever speed and clutch control for use with friction drives commonly employed in small home and garden implements such as snow throwers and lawn mowers which typically have a two-wheel tractor unit powered by a small gasoline engine. In some prior art snow throwers, variation in the speed of the tractor wheels is controlled by one lever and the engagement and disengagement of the drive to the wheels is controlled by a separate clutch lever. Thus, both hands are required to actuate the necessary controls to change the speed or direction of the tractor wheels. The operation of the snow thrower is further complicated by the other manual controls such as the throttle and the discharge chute directional control as well as the necessity to grip the handle bars to guide vehicle movement.

SUMMARY OF INVENTION

The invention provides a single control lever for remotely varying the speed and the direction of rotation of the drive wheels and for clutching and declutching the drive train to the wheels.

The control lever is supported by a mounting block on the handle bar assembly for lever movement fore and aft and transverse to the direction of vehicle movement. Fore and aft and transverse movement of the control lever is guided by a guide track or panel with a cut-out. The track includes a plurality of generally parallel slots extending forwardly from a transverse slot for the forward speeds and a rearwardly extending slot for reverse vehicle movement. Movement of the control lever in the transverse slot actuates a speed control linkage which axially shifts a friction wheel on its rotational axis and changes the radial position of the friction wheel with respect to a drive disc driven by the engine to vary the speed ratio between driving and driven members.

Movement of the control lever and mounting block forwardly into one of the forwardly extending slots actuates a clutch linkage which swings the friction wheel in an arc about a second axis to engage the friction wheel with the drive disc at the selected radial position.

The clutch linkage includes toggle links spring biased to move away at both sides of a center position. When the control lever is in the transverse slot, the clutch is in neutral and the toggle linkage is on center with the toggle links in alignment, thereby neutralizing spring action and maintaining the neutral position. Slight movement of the control lever into either one of the forward slots or the reverse slot will break the toggle. The linkage will then be shifted automatically by the spring into forward or reverse position. The toggle and spring biases the friction wheel toward its engaged position inasmuch as pressure is required to move the control lever and the toggle links to the on-center neutral position. However, the direction of rotation of the drive disc with respect to the arc about which the friction wheel swings is effective in the reverse clutched position to swing the friction wheel on its arc away from positive driving engagement of the wheel and disc, notwithstanding the spring bias. Accordingly, the operator has to maintain manual pressure on the control handle in its reverse mode to keep the wheel and disc engaged. In the forward mode, the direction of rotation of the drive disc with respect to the arc about which the friction wheel swings, assists the spring to keep the parts in positive driving engagement.

An important object and advantage of the present invention resides in the fact that the operator moves the single control lever in a natural movement, forward for forward speeds and rearward for reverse. The toggle linkage aforesaid is an important instrumentality to achieve this sequence in the exemplified embodiment.

Further objects and advantages of the invention will become apparent from the following disclosure.

DRAWINGS

FIG. 1 is a top view in fragmentary section of an implement tractor embodying the control lever and control linkages of the invention, the drive wheel 32 being shown in reverse position.

FIG. 2 is a fragmentary view similar to FIG. 1 showing substantially only the control lever and control linkages.

FIG. 3 is a side view of the apparatus shown in FIG. 2.

FIG. 4 is an enlarged fragmentary perspective view of the control lever and its mounting block.

FIG. 5 is a fragmentary sectional view along Line 5–5 of FIG. 1.

FIG. 6 is a fragmentary sectional view along Line 6–6 of FIG. 1.

FIG. 7 is a perspective view on a reduced scale of a snow thrower embodying the invention.

FIG. 8 is a fragmentary side view with portions broken away showing the drive arrangement to the wheel axle.

FIG. 9 is a diagramatic perspective view of the drive train.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures.

Tractor unit 10 (FIGS. 1 and 7) is adapted for use with snow throwers, lawn mowers, etc. and includes an upstanding frame portion 12 with handles 14 for guiding tractor movement. The frame portion 12 is connected to a tractor housing 16. The housing 16 is supported for travel above the ground by a wheel axle 18, which is journaled in the housing 16 on bearing 17. Axle 18 carries wheels 20 and 22. Power is supplied to the wheels 20 and 22 by an engine 24 (FIG. 7) which has an output shaft (not shown) and a drive train 25. The output shaft is connected to a drive disc 28 (FIG. 1) by an endless belt 30. The engine 24 also drives a pulley 29 which can be used to power a snow thrower impeller 31 and auger, a lawn mower cutting reel, etc. Power is transmitted from the drive disc 28 to the axle 18 by a rubber tired friction wheel 32.

Means are provided for supporting the friction wheel 32 for rotation about a first axis and axial movement along the first axis, thus, to change the speed ratio and drive direction between the drive disc 28 and the friction wheel 32, and for swinging movement in an arc about a second axis for engagement and disengagement of the friction wheel 32 with the drive disc 28. In the disclosed construction, the means includes a first shaft or spline shaft 34 which provides the first axis. A splined collar 33 in the friction wheel 32 affords sliding axial movement or shifting of the friction wheel 32 on the spline shaft 34 for changing the speed and direction of rotation of the tractor wheels as hereinafter described. The second axis for the friction wheel 32 is provided by a second or rock shaft 38 supported in suitable sockets 37 formed in the walls of the housing 16. The spline shaft 34 is swingably supported for movement in an arc about the second axis provided by rock shaft 38 by a pair of spaced swing arms 40 and 42 which can either be pivotably connected or fixed to shaft 38. The arms 40, 42 also carry bearings 44 for rotatably supporting the spline shaft 34. The friction wheel 32 is caused to move axially along the spline shaft 34 by a shift arm or bracket 46 which projects from a ball bearing housing 47, the inner race of which is connected to the hub of the friction wheel 32. The shift arm 46 is guided for axial movement on rock shaft 38. The shift arm 46 is part of the mechanism by which the wheel 32 is shifted axially along the spline shaft 34.

Power from disc 28 to the wheel 32 and then to the spline shaft 34 is transferred from the spline shaft 34 to the wheel axle 18 by a planetary gear set including planet gear 48 which is fixed to shaft 34 and which meshes with a sun gear 50 freely rotatably supported on shaft 38. The hub of gear 50 is fixed to side gear 51 which meshes with drive gear 52 fixed to the axle 18. The planet gear 48 orbits or swings in an arc about sun gear 50 when the friction wheel 32 is swung about the axis of rock shaft 38, as subsequently described.

In accordance with the invention, a single control lever 60 is provided to perform the dual functions of clutching and declutching the friction wheel 32 with respect to the drive disc 28 and shifting the axial position of the friction wheel 32 on the spline shaft 34, thus to alter the speed and direction of rotation of the tractor wheels.

Means are provided for supporting the control lever 60 for movement about first and second transverse control lever axes 81, 79. As disclosed for exemplification, the means comprises a control lever shift block 64 (FIGS. 2, 3, 4). The block 64 can be solid or skeletonized. In the disclosed embodiment the block comprises a pair of spaced web portions 68 and 70 (FIG. 4) interconnected by side portions or legs 72 and 74. The mounting block 64 is pivotally supported on the upstanding frame portion 12 for movement about the second control lever axis 79 by spaced ears 76 which can be stamped or struck from the frame 12. Bolts or rivets 78 on axis 79 pivotally support the side legs 72 and 74. The first axis 81 for the control lever 60 is established by co-axial apertures 80 in the web portions 68 and 70. The apertures 80 receive a downturned leg or extension 82 on the control lever 60. The first axis 81 is swingable fore and aft in a vertical plane and the second axis 79 is generally horizontal and fixed.

The control lever 60 is guided for movement about the first and second axes 81, 79 by a cut-out or guide track 86 in a control panel 87 (FIG. 1). The guide track 86 has a transversely extending slot 88 and several forwardly extending slots 90 separated by fingers 92 and a rearwardly extending slot 94. Movement of the control lever 60 along the transverse slot 88 causes rotation movement of the downturned leg 82 about the first control lever axis 81 in the mounting block 64. Movement of the control lever 60 fore or aft in the slots 90 or 94 causes movement of the mounting block 64 about the second or horizontal axis 79.

SPEED CONTROL SHIFT MOTIONS

The invention also provides means for connecting the control lever 60 to the friction wheel 32 to shift the friction wheel 32 axially along the spline shaft 34 upon movement of the control lever 60 about the first control lever axis 81. As disclosed, this means includes a crank arm 96 (FIGS. 1 and 4) which has an end 98 fixedly connected to the downturned leg 82 on the control lever 60. The other end 100 of the crank arm 96 is pivotally connected to a speed control rod link 102 by a pin 104 which has a transverse aperture 106 which receives a bent portion 108 of the speed control rod link 102. As shown in FIG. 2, the link 102 has an extension 107. The links 102, 107 have slotted adjacent end portions 108 and 110 connected by a length adjustment bolt 112.

The means connecting the control lever 60 to the friction wheel 32 also includes the shift arm 46 (hereinbefore described) and a bell crank 124 (FIGS. 1 and 6) which is pivoted intermediate its length to a tab 125 on the housing 16 by a bolt or pin 126. The arm 128 of the bell crank 124 has an aperture 130 which receives a downturned portion 132 (FIG. 5) of link 107. The arm 134 of bell crank 124 is provided with a pin 136 which is received in a slot 138 in a bracket 139 (FIGS. 1 and 6) on shift arm 46.

Movement of the control lever 60 in the transverse track 88 causes movement of the bell crank 124 which thus shifts bracket arm 46 and the friction wheel 32 axially of the spline shaft 34 to vary the point of contact of the friction wheel 32 with the drive disc to change the speed and direction of rotation of the wheels 20 and 22.

The control panel 87 can be provided with a shallow notch 162 (FIG. 1) to retain the control lever 60 in the neutral position. The three slots 90A, B and C provide the various forward speeds designated 1, 2, 3 on panel 87. Additional slots could be employed. When the control lever 60 is moved into slot 90A and speed 1, the friction wheel 32 is shifted axially on shaft 34 to a location at one side of the drive disc axis as shown in broken lines in FIG. 1 and 9. The slot 90A affords the slowest wheel speed inasmuch as the drive circle on disc 28 has a small diameter. Movement of the control lever into slots 90B (speed 2) and 90C (speed 3) moves the friction wheel 32 farther away from the axis of rotation of the drive disc 28, thus to provide larger diameter drive circles on the drive disc 28 and thus higher rates of rotation of the friction wheel 32. When control lever 60 is in reverse position in slot 94, the friction wheel 32 is shifted axially past the axis of rotation of drive disc 28 and into its full line position shown in FIGS. 1 and 9. This reverses the direction of rotation of wheel 32 and ground wheels 20, 22.

CLUTCH CONTROL MOTIONS

Means are also provided for connecting the control lever 60 to the spline shaft 34, for swinging the friction wheel 32 in an arc about the rock shaft 38, thus to engage and disengage the friction wheel 32 with the drive disc 28. As shown in FIGS. 2, 3 and 4, the means includes a toggle linkage 140 which includes a first link 142 having an out turned end 144 pivotally connected to an upstanding ear or tab 146 which extends from mounting block side leg 74. The other end 147 of link 142 is pivotally connected to a linking plate 148 which is pivoted to the frame portion 12 by an ear 150. The means also includes a second link 152 which has a clevis 154 connected to the plate 148 by a bolt 153. The other end 155 of the second link 152 is connected to a bell crank lever 156 which is pivoted to the housing 16 and which changes the direction of thrust. The lever 156 is connected to a third link 158 which has an end 160 (FIGS. 1, 2 and 5) connected to swing arm 42.

When the control lever 60 is in the transverse slot 88 (desirably in notch 162), the drive is in neutral and links 142 and 152 are in an on-center position, as shown in broken lines and designated 170 in FIG. 3. When the control lever 60 is in neutral, the swing arms 40 and 42 are displaced from the drive disc 28 as shown in broken lines in FIG. 9, and the friction wheel 32 is disengaged from the drive disc 28. A spring 161 connected between the housing and a bracket 162, which is fixed to arm 42, biases the friction wheel toward the drive disc 28. This bias is also transmitted through rod 158, lever 156 and rod 152 to the toggle plate 148 to bias the toggle for movement in both directions off dead center. With control lever 60 in the neutral transverse slot 88, the toggle is on-dead center. Any slight forward or reverse pressure, when the lever 60 is aligned with any one of forward slots 90A, 90B and 90C and reverse slot 94 is required to break the toggle and allow spring 161 to automatically clutch the drive train in the selected forward or reverse mode.

For example, slight forward pressure on the control lever 60 about the second axis 79 will break the toggle, and the links 142 and 152 are drawn by spring 161 to an over center position, as shown in full lines in FIG. 3. The movement of the link 152 causes the lever 156 to move the third link 158 and swing arm 42 about shaft 38 from the broken line position in FIG. 9 to the solid line position and cause engagement of friction wheel 32 with the drive disc 28.

When the control lever 60 is moved rearwardly about the second axis 79 into the reverse drive slot 94 (FIG. 1) the links 142 and 152 are drawn by spring 161 from the full line position of FIG. 3 through the on-center position 170 and to the over-center position 172 (FIG. 3), thus to engage the friction wheel 32 with the drive disc 28 as shown in full lines in FIGS. 1 and 9. With the parts thus positioned, the rotation of the drive disc 28 tends to disengage the friction wheel 32 from disc 28 to provide a dead-man feature. The spring 161 is not strong enough to keep the wheel in positive drive relation to disc 28. Accordingly, when the control lever is in the reverse drive slot 94, manual rearward pressure on the control lever 60 is required to maintain the friction wheel 32 in clutched engagement with the disc 28.

The control lever 60 is moved by the operator in a natural forward and backward direction to drive the vehicle in forward and reverse directions. The spring biased toggle automatically clutches in forward direction and shifts the parts toward clutched engagement in reverse, but the operator must exert some manual pressure to maintain the parts engaged in reverse.

What is claimed is:

1. In a drive train for supplying power to an axle and including a drive disc engageable with a friction wheel, control means for shifting said friction wheel axially along a first friction wheel axis and for swinging said friction wheel in an arc about a second axis, the improvement in which said control means comprises a single remote control lever, means for supporting said control lever for movement about first and second transverse control lever axes, and means for connecting said single control lever to said friction wheel to shift said friction wheel axially along said first friction wheel axis to vary the rate of rotation of said axle upon movement of said control lever about said first control lever axis and means connecting said control lever to the friction wheel for swinging said friction wheel in an arc about said second axis to engage and disengage said friction wheel with said drive disc upon movement of said control lever about said second control lever axis.

2. A drive train in accordance with claim 1 wherein said means for supporting said friction wheel for axial movement about a first friction wheel axis and swinging movement in an arc about a second axis comprises a first shaft, an aperture in said friction wheel receiving said first shaft, a second shaft, a pair of spaced arms swingably supported on said second shaft and rotatably supporting said first shaft, a hub on said friction wheel, and a bracket connected to said hub and swingably supported on said second shaft.

3. A drive train in accordance with claim 1 wherein said means for supporting said control lever for movement about said first and second transverse axes comprises a shift block to which said control lever is connected.

4. A drive train in accordance with claim 3, wherein said single control lever comprises a leg pivotally connected to said shift block, said means for connecting said control lever to said friction wheel to shift said friction wheel axially of said first friction wheel axis comprising a speed control rod linkage including a crank arm fixedly connected to said leg on said control lever, a bell crank remote from said control lever, a link connecting one end of said bell crank to said crank arm, a shift bracket for the friction wheel, means connecting the other end of said bell crank to said bracket so that movement of said control lever about said first control lever axis pivots said bell crank to shift said bracket and said friction wheel axially of said first friction wheel axis to change the point of contact of said friction wheel with said drive disc to change the rate of rotation of said friction wheel.

5. A drive train in accordance with claim 3 wherein said means connected to said control lever for swinging said friction wheel in an arc about said second friction wheel axis comprises a toggle linkage connecting said control lever mounting block to said friction wheel bracket, said toggle linkage being on center to afford a neutral position with said friction wheel disengaged and movable on both sides of center to afford engagement of said friction wheel with said drive disc.

6. A clutch linkage in accordance with claim 5 wherein said toggle linkage includes a linking plate pivotally connected to said frame, a first link having one end pivotally connected to said mounting block and another end pivotally connected to said linking plate, a second link having one end pivotally connected to said friction wheel arm and the other end pivotally connected to said linking plate so that movement of said control lever about said second axis in a forward direction causes said first link and said second link to move from an on-center neutral position to one side of center and movement of said control lever rearwardly about said second axis causes movement of said first and second links to the other side of center.

7. A drive train in accordance with claim 1 including a panel having a guide track for guiding movement of said control lever, said guide track including a transversely extending slot and a plurality of forwardly extending slots and a rearwardly extending slot, said transversely extending slot guiding control lever movement about said first control lever axis and said forwardly and rearwardly extending slots guiding control lever movement about said second control lever axis.

8. A tractor comprising a frame, a wheel axle rotatably supported on said frame, a drive disc, a friction wheel engageable with said drive disc, means for supporting said friction wheel for rotation about a first axis and axial movement relative to said first axis and radial movement with respect to said drive disc to change the speed ratio between said drive disc and said friction wheel, said means further affording swinging movement of said first axis in an arc about a second axis for engagement and disengagement of said friction wheel with said drive disc, means for drivingly connecting said friction wheel to said wheel axle, a control lever, means for supporting said control lever on said frame for movement about first and second transverse axes and means for connecting said control lever to said means for supporting said friction wheel to shift said friction wheel axially of said first axis in response to movement of said control lever in one direction and to swing said friction wheel about said second axis to engage and disengage said friction wheel with said drive disc upon movement of said control lever in a direction transverse to said firSt direction.

9. A tractor in accordance with claim 8, wherein said means for drivingly connecting said friction wheel to said wheel axle comprises a first shaft forming said first axis, said first shaft being splined to said friction wheel, a second shaft, having a first gear, a gear on said first shaft in mesh with said gear on said second shaft, a second gear on said second shaft in mesh with a gear on said axle, with said gear on said first shaft orbiting about said first gear on said second shaft as said first axis is moved in an arc about said second axis when said friction wheel is engaged and disengaged with said drive disc.

10. A single lever control for the driving wheels of a vehicle and comprising:
 a drive train for said wheels having parts which require relative movement in one direction for clutching purposes and relative movement in another direction for speed control purposes,
 a set of linkages for producing said relative movement in said one direction,
 another set of linkages for producing said relative movement in said other direction,
 a control block having parts swingable about one axis and to which said set of linkages are connected and parts swingable about another axis and to which said other set of linkages are connected,
 and a single control lever connected to said control block to swing said parts about said one axis when the lever is moved in one direction and connected to said control block to swing said parts about the other axis when the control lever is moved in a different direction.

11. A single lever control in accordance with claim 10 wherein said drive train includes a drive disc and a friction wheel engageable with said drive disc and movable axially along a first friction wheel axis and in an arc about a second friction wheel axis and wherein one of said sets of linkages is connected to said friction wheel to shift said friction wheel axially upon movement of said control lever about said first control lever axis and the other of said sets of linkages is connected to said friction wheel to swing said friction wheel about said second friction wheel axis upon movement of said control lever about said second control lever axis.

12. A single lever control in accordance with claim 10 wherein one of said sets of linkages includes a toggle connecting said control block to said drive train, said toggle being movable between an on-center position affording a neutral condition with said drive train disengaged and over center positions on both sides of said center position with said drive train engaged.

13. The single lever control of claim 12 in which said toggle is provided with a spring to bias the toggle toward said over-center position.

14. The single lever control of claim 13 in which said drive train has forward and reverse positions, said drive train having rotating elements which assist said spring in forward position and which oppose said spring in reverse position.

15. Apparatus for controlling the driving wheels of a vehicle comprising: a drive train for said wheels having parts which require relative movement in one direction for clutching purposes and relative movement in another direction for speed control purposes, a single control lever, means for supporting said control lever for movement about first and second transverse axes, means for connecting said control lever to said drive train parts to afford movement of said parts for clutching purposes upon movement of said control lever about one of said first and second control lever axes and to afford movement of said parts for speed control purposes upon movement of said control lever about the other of said first and second axes.

16. Apparatus in accordance with claim 15 wherein said means for supporting said control lever for movement about first and second transverse axes comprises a mounting block having spaced legs pivotally connected to a frame to provide one of said first and second axes and wherein said control lever is pivotally connected to said mounting block to provide the other of said first and second axes.

17. In a drive train for supplying power to an axle and including a drive disc engageable with a friction wheel, control means for shifting said friction wheel axially and for moving said friction wheel into engagement and disengagement with said drive disc, the improvement in which said control means comprises a single remote control lever, means for supporting said control lever for movement about first and second transverse control lever axes, and means for connecting said single control lever to said friction wheel to shift said friction wheel axially along said friction wheel axis to vary the rate of rotation of said axle upon movement of said control lever about said first control lever axis and means connecting said control lever to the friction wheel for moving said friction wheel to engage and disengage said friction wheel with said drive disc upon movement of said control lever about said second control lever axis.

* * * * *